United States Patent
Tsai et al.

(10) Patent No.: US 6,804,060 B1
(45) Date of Patent: Oct. 12, 2004

(54) INTERFERENCE FILTER FABRICATION

(75) Inventors: John C. Tsai, Saratoga, CA (US); David W. Wang, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 93 days.

(21) Appl. No.: 09/968,163

(22) Filed: Sep. 28, 2001

(51) Int. Cl.$^7$ .............. G02B 1/10; G02B 6/18
(52) U.S. Cl. .............. 359/587; 427/163.2; 427/265; 359/580
(58) Field of Search .............. 359/580, 586, 359/587; 427/163.2, 265, 162, 164, 165

(56) References Cited

U.S. PATENT DOCUMENTS

| | | | |
|---|---|---|---|
| 4,674,100 A | 6/1987 | Kobayashi | 372/96 |
| 4,740,951 A | 4/1988 | Lizet et al. | 370/3 |
| 4,852,960 A | 8/1989 | Alferness et al. | 350/96.19 |
| 5,029,981 A | 7/1991 | Thompson | 350/162.23 |
| 5,195,161 A | 3/1993 | Adar et al. | 385/129 |
| 5,305,330 A | 4/1994 | Rieder et al. | 372/29 |
| 5,500,916 A | 3/1996 | Cirelli et al. | 385/37 |
| 5,726,805 A * | 3/1998 | Kaushik et al. | 359/589 |
| 6,023,354 A | 2/2000 | Goldstein et al. | 359/15 |
| 6,031,951 A | 2/2000 | Stiens | 385/37 |
| 6,101,302 A | 8/2000 | Park et al. | 385/37 |
| 6,212,312 B1 | 4/2001 | Grann et al. | 385/24 |
| 6,215,928 B1 | 4/2001 | Friesem et al. | 385/37 |
| 6,404,947 B1 | 6/2002 | Matsuda | 385/24 |
| 6,459,533 B1 | 10/2002 | Clapp et al. | 359/578 |
| 6,490,393 B1 | 12/2002 | Zhou | 385/37 |
| 6,522,795 B1 | 2/2003 | Jordan et al. | 385/10 |
| 2003/0026515 A1 | 2/2003 | Barenburg et al. | 385/14 |

FOREIGN PATENT DOCUMENTS

| | | |
|---|---|---|
| EP | 1 028 504 A1 | 8/2000 |
| JP | 56905 * | 3/1987 |
| JP | 402189529 A | 7/1990 |
| JP | 45514 * | 2/1993 |
| WO | WO 95 08206 | 3/1995 |

* cited by examiner

*Primary Examiner*—Brian K. Talbot
(74) *Attorney, Agent, or Firm*—Raymond E. Roberts; Intellectual Property Law Offices

(57) ABSTRACT

An interference filter (10) and a process (100) by which it may be fabricated. A substrate (12, 52, 82) is provided and a working region (56, 84) is defined therein or thereupon. Relative to the horizontal substrate (12, 52, 82), a plurality of vertical layers having differing refractive index are then constructed by applying material into the working region (56, 84) or altering material already in the working region (56, 84). Photo masking and etching processes may be used to selectively remove material in the working region (56, 84) for applying additional material having a differing refractive index. Photo masking and impurity doping processes may be used to selectively change material to have a differing refractive index.

19 Claims, 12 Drawing Sheets

INTERFERENCE FILTER FABRICATION

TECHNICAL FIELD

The present invention relates generally to optical filters and more particularly to a method for making interference filters.

BACKGROUND ART

A traditional interference filter is produced by stacking, typically by depositing, many layers of dielectric thin film materials horizontally on a glass substrate. The thickness and the types of materials of these thin films may vary depending on the application. In general, the films are alternating and equal to m*λ/4 in thickness, where m is an odd integer number. For a narrowband filter, the number of layers can be as high as 100.

FIG. 1 (background art) is a cross section side view of a traditional interference filter 1, made according to conventional manufacturing processes. The interference filter 1 has a plurality of dielectric material layers 2 deposited on a glass substrate 3. The number of the material layers 2, and the materials used in them, may vary from one application to another. In FIG. 1 the material layers 2 are depicted as being of four different materials 2a–d. To represent the operational characteristics of the interference filter 1, as a laser beam 4 is shown with its angle of incidence purposely skewed to show how reflected beams 5 are produced at each interface of the material layers 2.

Many factors affect the result of the thin film deposition processes currently used in manufacturing interference filters. These include: absolute thickness, evaporation rate, background gas pressure, tooling factor, coating material structure, temperature, etc. During the thin film deposition process, the substrates cannot be removed from the coating chamber for inspection and information on the source of error cannot be traced if the final result deviates from expectations.

Unfortunately, in conventional interference filter manufacturing the final results often deviate far from reasonable manufacturing expectations. From the information which the inventors are aware of, and this is admittedly somewhat limited because many manufacturers keep such information proprietary, the overall current average yield in narrowband filter manufacturing today is less than 30%.

Such a yield contrasts markedly with that in some other industries. For example, semiconductor microfabrication, where an average yield of 80% is normal. In general, semiconductor microfabrication processes have reached a mature stage and manufacturing yields are thus quite satisfactory. Dimensional control is very good, and can reach 0.25 microns or even smaller. There have also been thorough studies of photolithography, material deposition, etching processing, etc., as are widely used in semiconductor microfabrication.

It therefore has been the inventors' observation that improved interference filter manufacturing processes are desirable. Preferably, such improved processes should produce interference filter manufacturing yields closer to those common for matured technologies, such as semiconductor microfabrication.

DISCLOSURE OF INVENTION

Accordingly, it is an object of the present invention to provide improved processes to fabricate interference filters.

And another object of the invention is to provide such processes which particularly provide a high yield of interference filters.

Briefly, one preferred embodiment of the present invention is a method for fabricating an interference filter. A substrate is provided. A working region is then defined with respect to the substrate. Finally, a plurality of layers of coating materials are constructed vertically in the working region, relative to the horizontal substrate.

Briefly, another preferred embodiment of the invention is an interference filter made by the method for fabricated, described above.

An advantage of the present invention is that it provides multiple, flexible, and combinable approaches to fabricating interference filters.

Another advantage of the invention is that it may facilitate quality review throughout fabrication, and thus problem identification and correction, and improved yield and end product quality.

Another advantage of the invention is that it may employ already well known and widely used manufacturing processes and materials, adopted from conventional electronic semiconductor integrated circuit (IC) and micro electromechanical system (MEMS) manufacturing. Highly desirable attributes of such processes may thus be imparted to the inventive processes and the products produced there with, including mass automated manufacturing, rigorous quality control, high yields, and low cost.

And another advantage of the invention is that it permits easy, very high integration with other products of conventional micro manufacturing processes.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which:

FIGS. 3a–j are a series of views at different stages of manufacture of one presently preferred embodiment of the inventive interference filter, in which:

FIG. 3a is a side view of a substrate of the interference filter;

FIG. 3b is a side view of the interference filter after a portion of the substrate has been removed to create a working region;

FIG. 3c is a side view of the interference filter after a first coating material layer has been applied over the substrate;

FIG. 3d is a side view of the interference filter after excess material deposited when forming the material layer has been removed;

FIG. 3e is a side view of the interference filter after a photoresist layer has been applied on top of the working region;

FIG. 3*f* is a side view of the interference filter after the photoresist layer has been exposed under light and a pre-destinated pattern, to create exposed regions and unexposed regions in the photoresist layer above the working region;

FIG. 3*g* is a side view of the interference filter after the unexposed regions of the photoresist layer and material of the working region below them have been removed to create a trench array;

FIG. 3*h* is a side view of the interference filter after the exposed regions of the photoresist layer have also been removed;

FIG. 3*i* is a side view of the interference filter after a second coating material layer has been applied over the working region, filling in and over-filling the trench array;

FIG. 3*j* is a side view of the finished interference filter after extra material from application of the second coating material layer has been removed;

FIGS. 4*a–b* are a short series of views at different stages of manufacture of another presently preferred embodiment of the inventive interference filter, wherein: FIG. 4*a* is a side view of a substrate of the interference filter and FIG. 4*b* is a side view of the interference filter after a mask has been applied on top of the substrate and after further diffusion has occurred;

In the various figures of the drawings, like references are used to denote like or similar elements or steps.

BEST MODE FOR CARRYING OUT THE INVENTION

Figure 1:
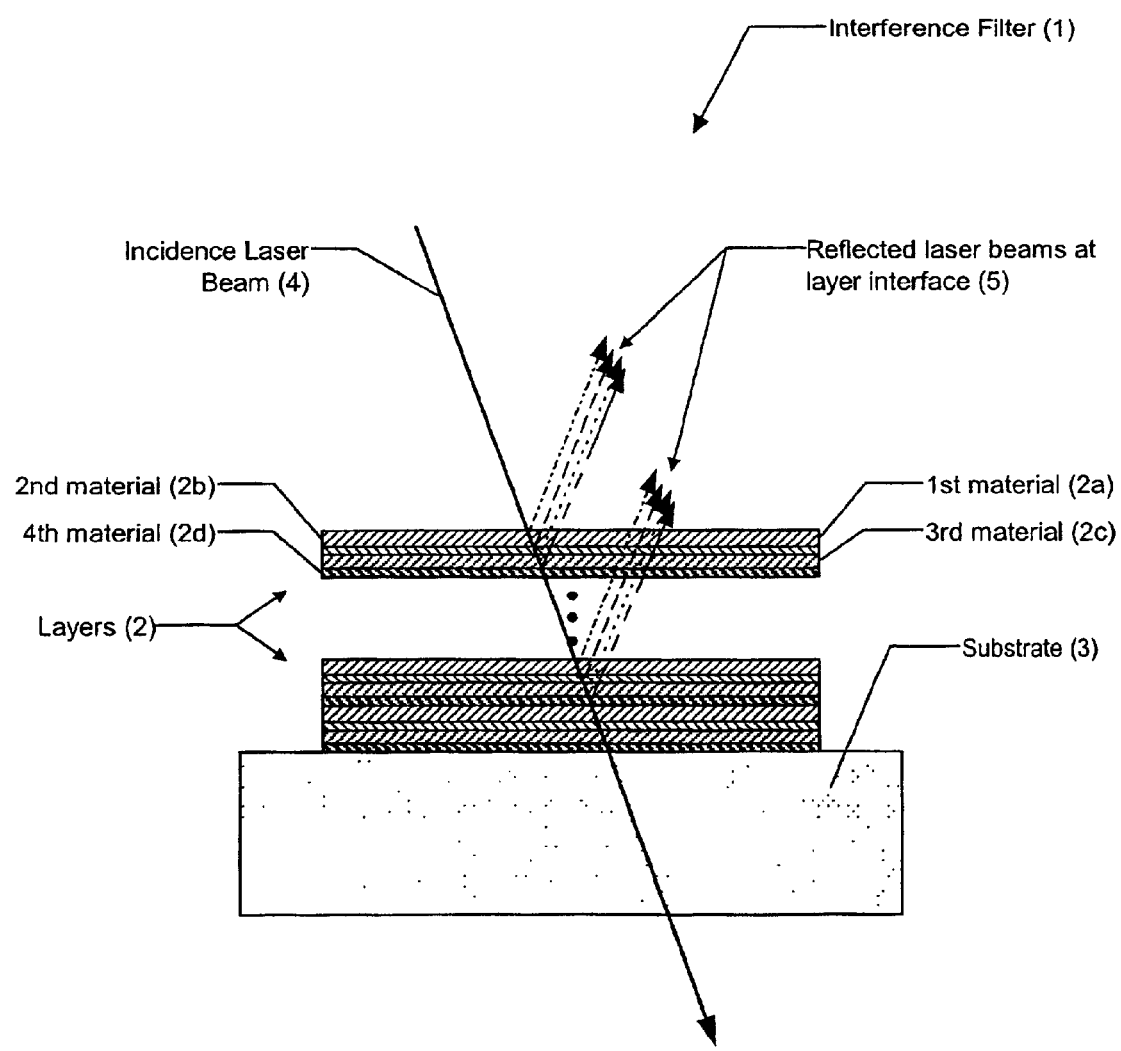
FIG. 1 (background art) is a side cross section view of a traditional interference filter made according to conventional manufacturing processes.

Preferred embodiments of the present invention are an interference filter and a process by which it may be fabricated. As illustrated in the various drawings herein, and particularly in the views of FIGS. 2*a–b* and FIG. 5, these preferred embodiments of the invention is depicted by the general reference characters 10 and 100.

Figure 2A:
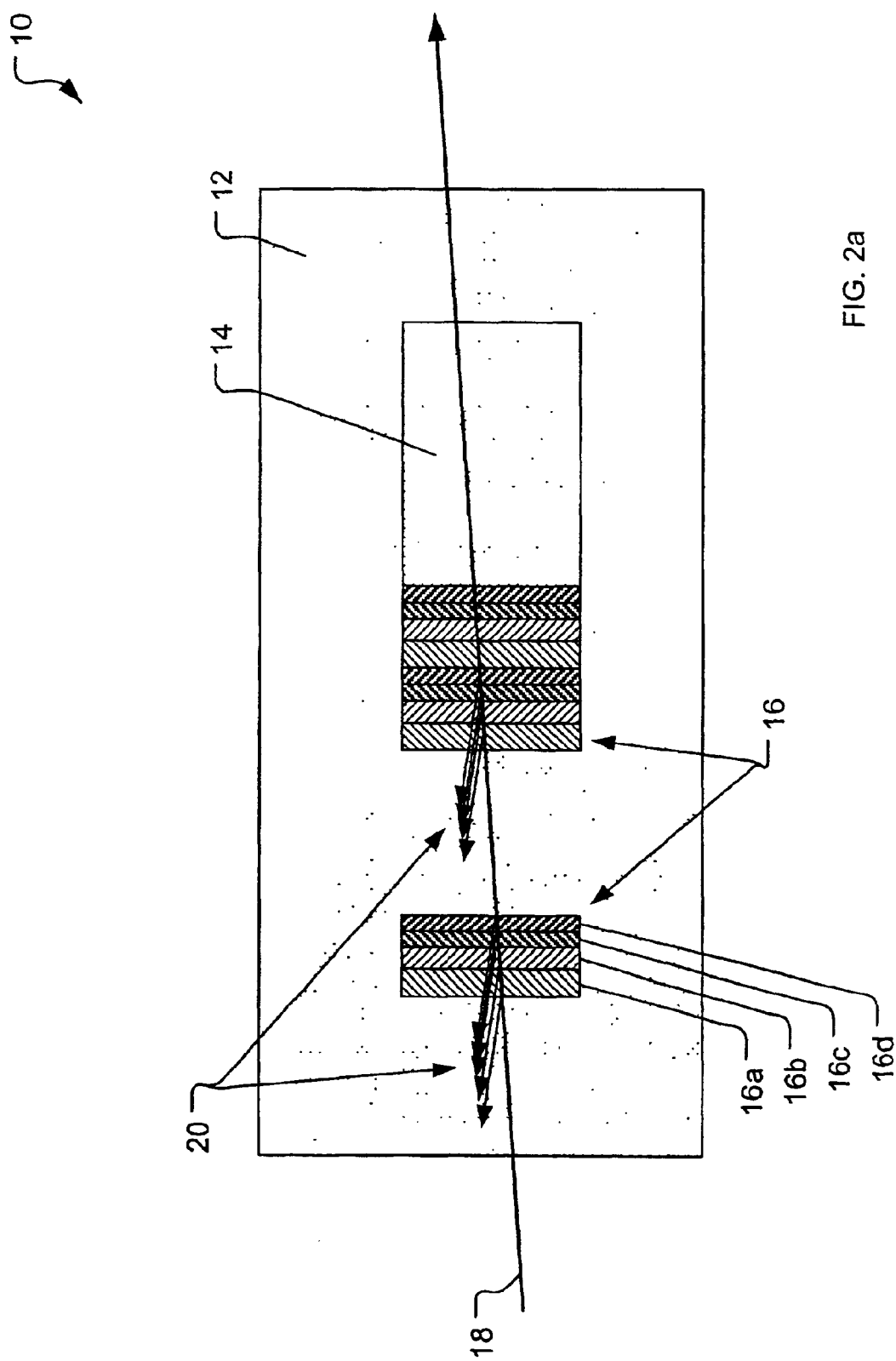
FIG. 2a is a top plan view and FIG. 2b is a side cross section view depicting an interference filter according to the present invention.
Figure 2B:
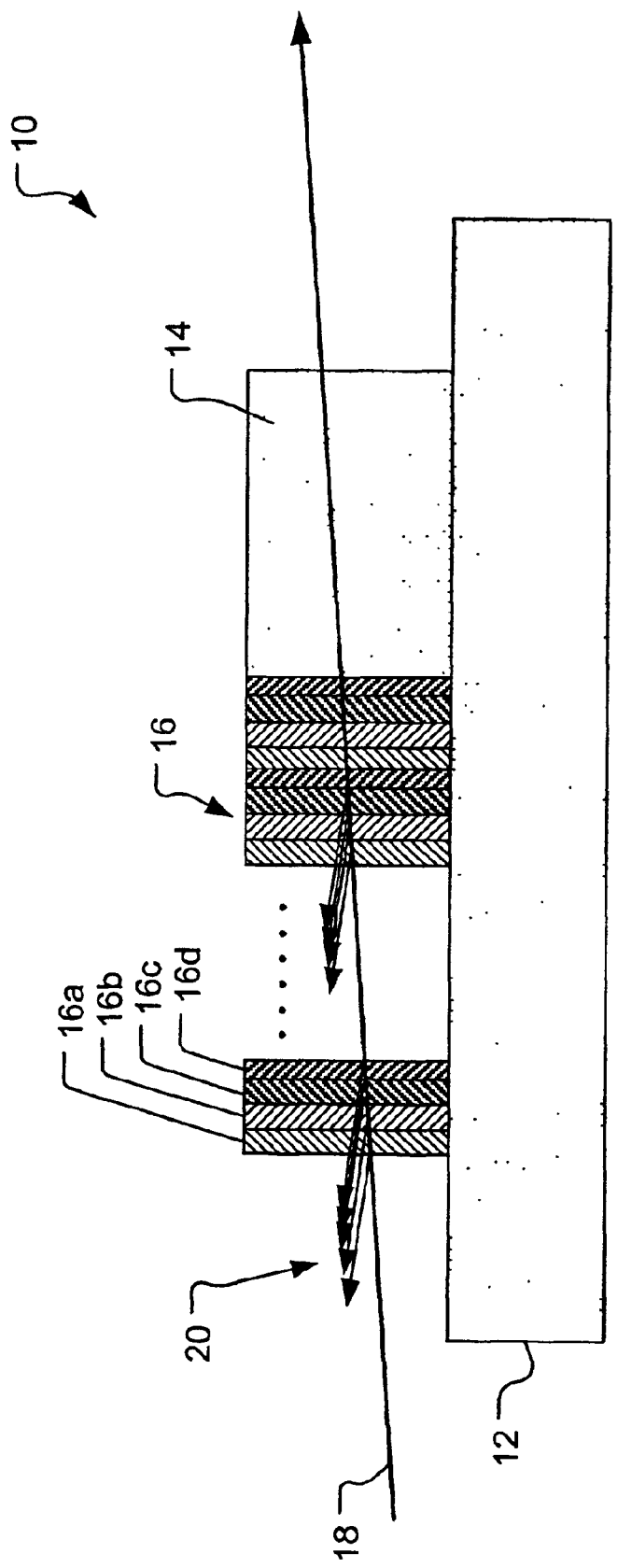

FIG. 2*a* is a top plan view and FIG. 2*b* is a cross section side view depicting the interference filter 10. A substrate 12 is provided, atop which the rest of the interference filter 10 is then constructed. A backing 14 is provided on or in the substrate 12. In FIGS. 2*a–b* the substrate 12 and the backing 14 are different, but this need not be the case and it often will not be.

The major operational features of the interference filter 10 are a series of vertical coating material regions 16. The number of these material regions 16, and the materials used in them, may vary from one application to another. In FIGS. 2*a–b* the material regions 16 are depicted as being of four different materials 16*a–d*.

To depict the operational characteristics of the inventive interference filter 10, a laser beam 18 is represented with its angle of incidence purposely skewed to show how reflected beams 20 are produced at each interface of the material regions 16. [For simplified explanation, "laser beam" is used herein as a generic term to represent all suitable light beams. Although light from laser sources is predominantly used today in applications where the inventive interference filter 10 will be employed, those skilled in the art will readily appreciate that the invention may be used with light from other sources as well.]

FIGS. 3*a–j* are a series of views at different stages of manufacture of one presently preferred embodiment of the interference filter 10. For the sake of simplicity, this embodiment uses only two coating layer materials, sandwiched together. Interference filters consisting of more than two materials can, of course, be generalized from the process now described. A key distinction over the prior art is that the coating materials used here are constructed "vertically" on a substrate.

Figure 3A:
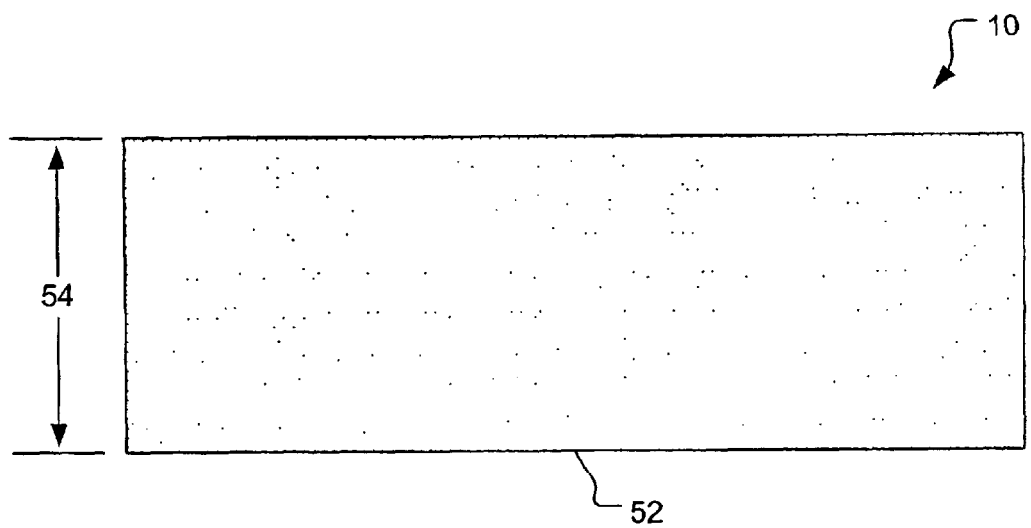

FIG. 3*a* is a side view of a substrate 52 of the interference filter 10. The substrate 52 is of a suitable material upon which the major operational elements are constructed. Unlike the case depicted in FIGS. 2*a–b*, where the substrate 12 and the backing 14 are different, the substrate 52 here functions as a material upon major operational elements are constructed and also as a material from which an operational element is constructed. The substrate 52 has a thickness 54, which the inventors prefer to be anywhere from a few hundred microns to a few millimeters. The substrate 52 is chosen to be transparent to the light wavelengths which the interference filter 10 will ultimately be used with.

Figure 3B:
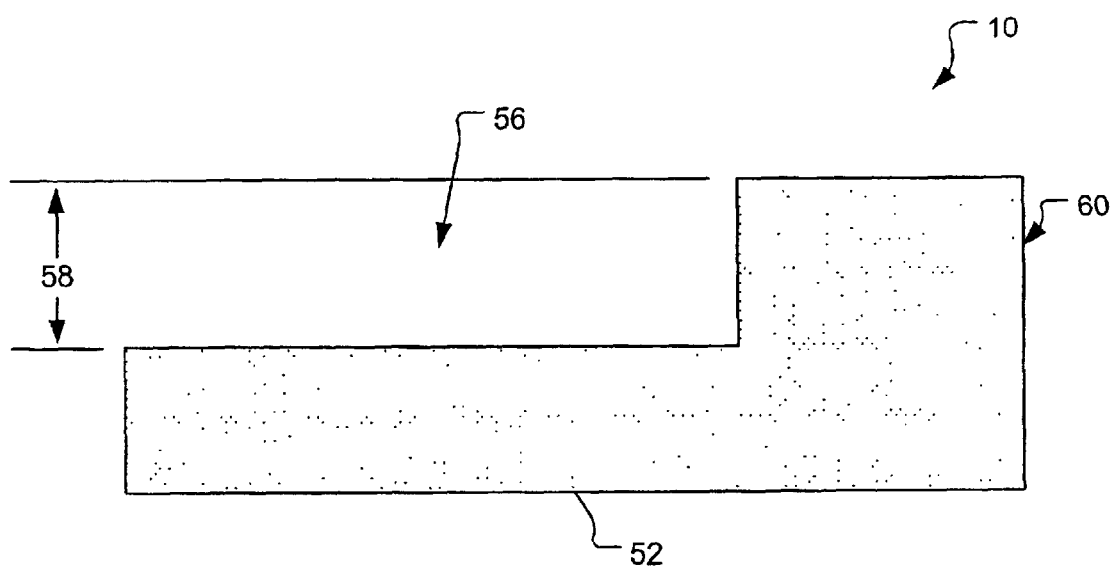

FIG. 3*b* is a side view of the interference filter 10 after a portion of the substrate 52 has been removed to create a working region 56. In this embodiment removal here is done by etching the portion away. The working region 56 has a depth 58 which is greater than the diameter of light beams the interference filter 10 will ultimately be used with. In FIG. 3*b* it can also be observed that creation of the working region 56 has defined a backing region 60 in the substrate 52, which is analogous to the backing 14 in FIGS. 2*a–b*.

Figure 3C:
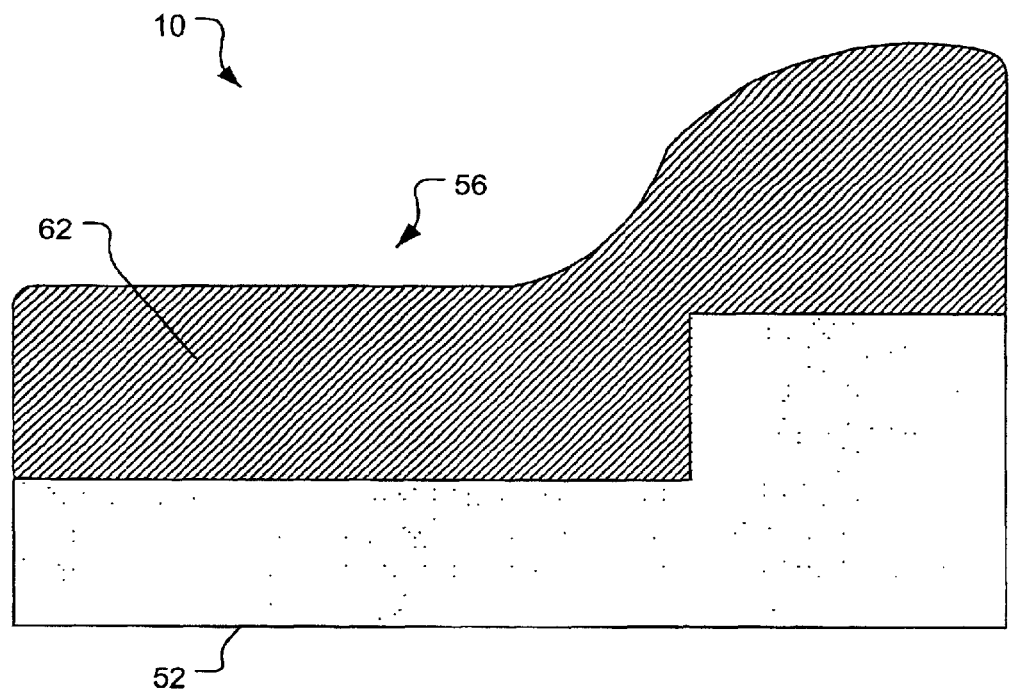

FIG. 3*c* is a side view of the interference filter 10 after a first coating material layer 62 has been applied over the substrate 52. In this embodiment this is accomplished by depositing the material layer 62. The thickness of deposition is preferably greater than the depth 58 of the working region 56, thus over-filling it.

Figure 3D:
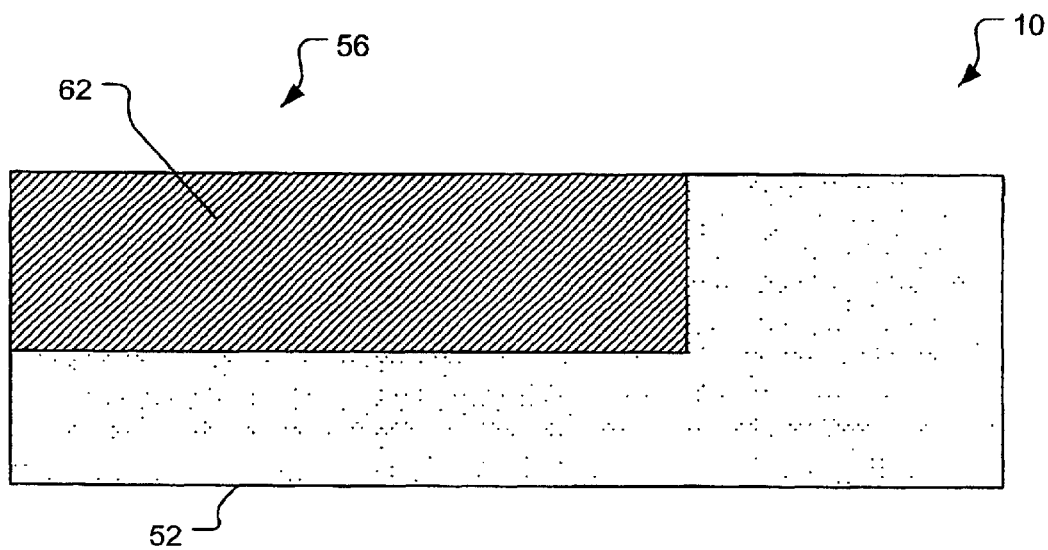

FIG. 3*d* is a side view of the interference filter 10 after excess material deposited when forming the material layer 62 has been removed. In this embodiment the extra material is removed by polishing.

Figure 3E:
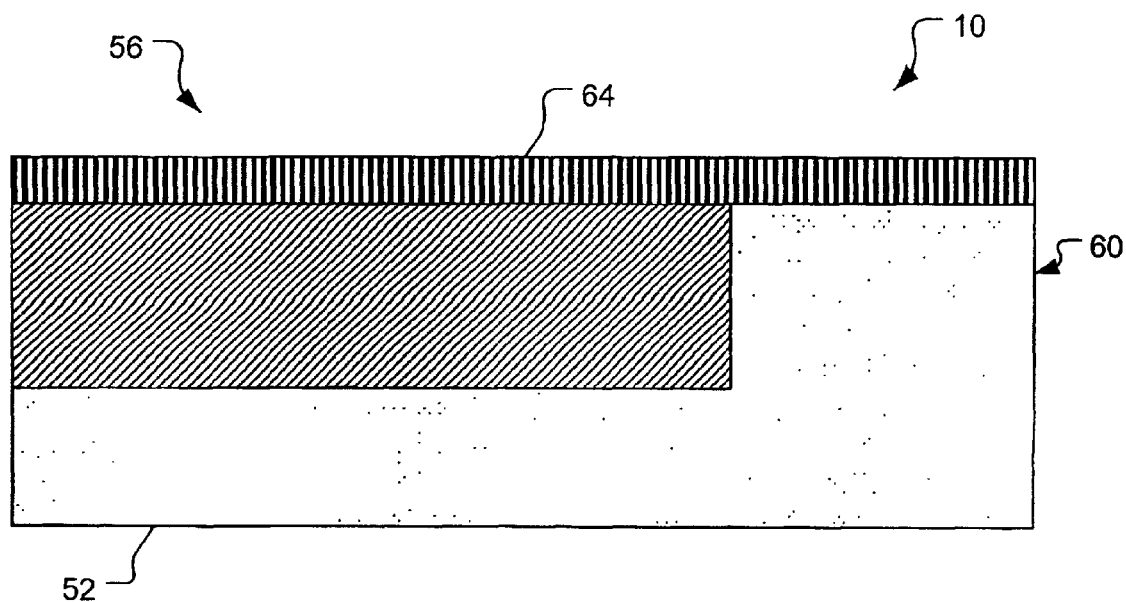

FIG. 3*e* is a side view of the interference filter 10 after a photoresist layer 64 has been applied on top of the working region 56. In this embodiment the photoresist layer 64 is also applied by depositing.

Figure 3F:
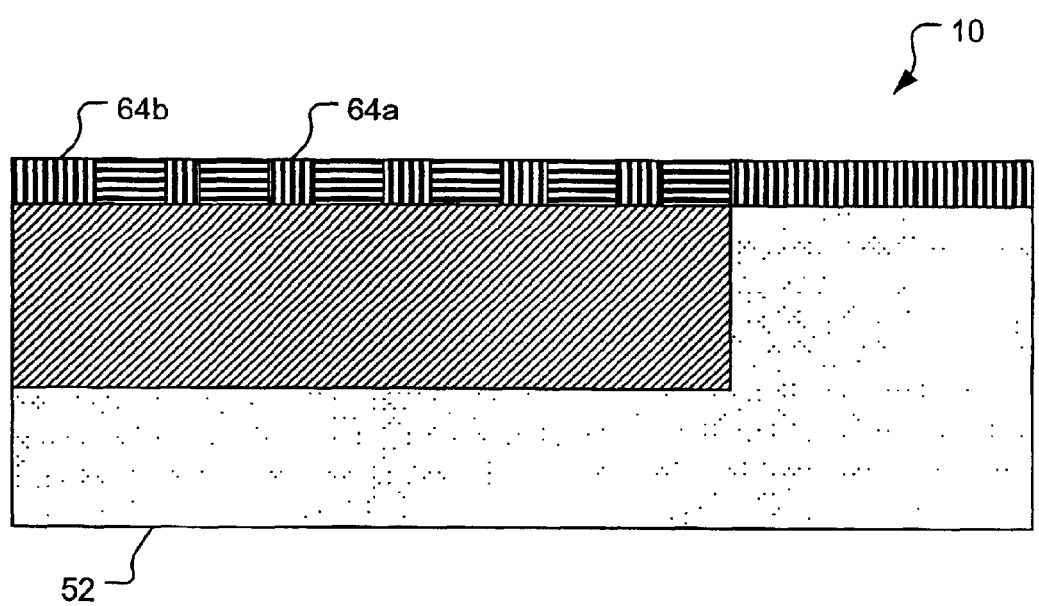

FIG. 3*f* is a side view of the interference filter 10 after the photoresist layer 64 has been exposed under light and a predestinated pattern, to create exposed regions 64*a* and unexposed regions 64*b* in the photoresist layer 64 above the working region 56.

Figure 3G:
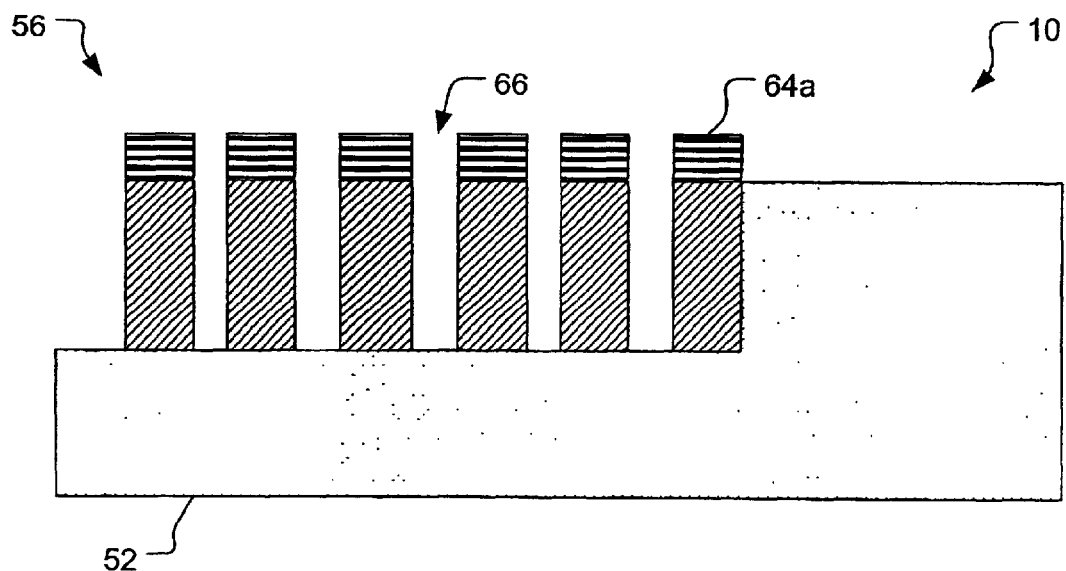

FIG. 3*g* is a side view of the interference filter 10 after the unexposed regions 64*b* of the photoresist layer 64 and material of the working region 56 below them have been removed. This creates ditches or a trench array 66 which preferably, but not necessarily, extends through the material of the working region 56 all the way to the substrate 52 below. In this embodiment this removal operation is also performed by etching.

Figure 3H:
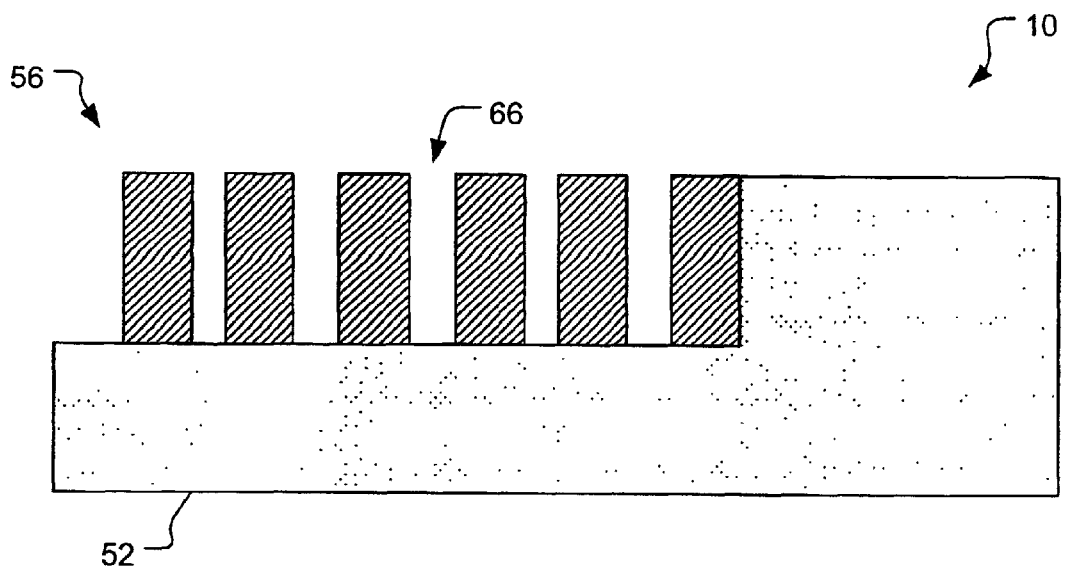

FIG. 3*h* is a side view of the interference filter 10 after the exposed regions 64*a* of the photoresist layer 64 has also been removed. In this embodiment this is done by stripping.

Figure 3I:
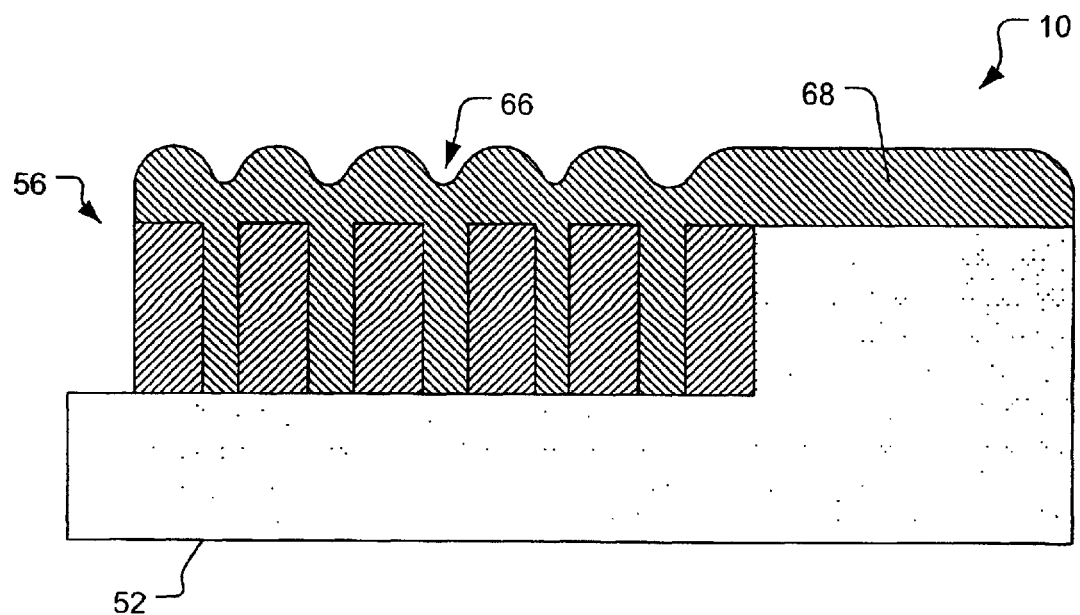

FIG. 3*i* is a side view of the interference filter 10 after a second coating material layer 68 has been applied over the working region 56, filling in and over-filling the trench array

66. As was the case for the coating material layer 62, in this embodiment the second coating material layer 68 is applied by deposition.

Figure 3J:
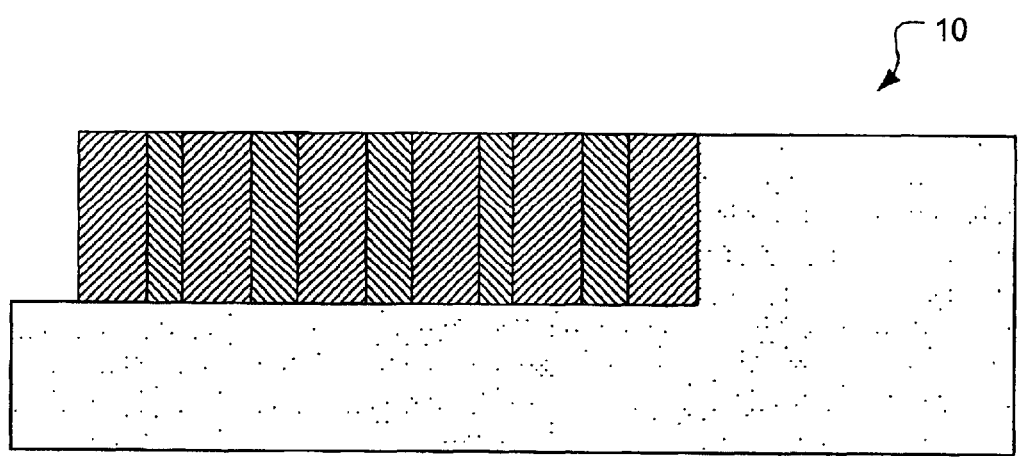

Finally, FIG. 3*j* is a side view of the finished interference filter 10, after extra material from application of the second coating material layer 68 has been removed. As was the case for the coating material layer 62, in this embodiment removal is also by polishing.

Figure 4A:
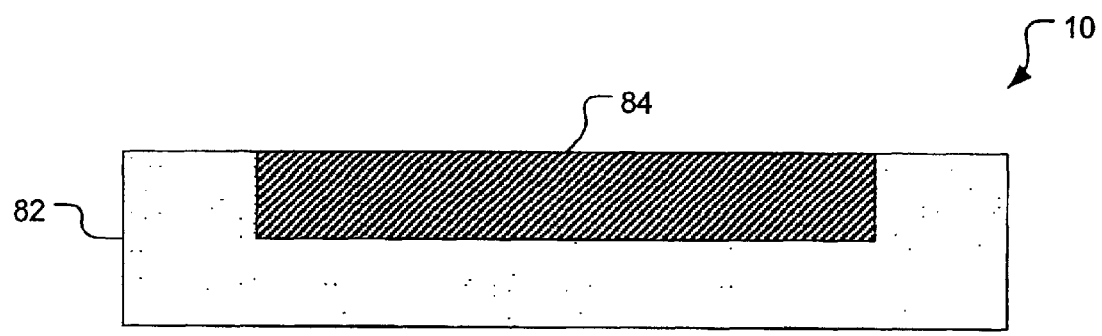
Figure 4B:
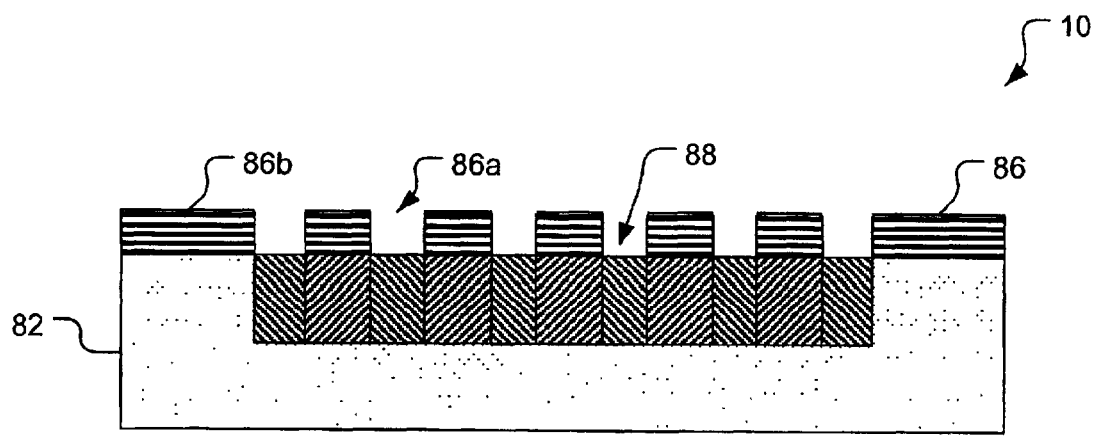

FIGS. 4*a–b* are a short series of views at different stages of manufacture of another presently preferred embodiment of the interference filter 10. A diffusion technique is used here.

FIG. 4*a* is a side view of a substrate 82 of the interference filter 10. In a working region 84 an impurity has been diffused into the substrate 82 to a predetermined dosage. For example hydrogen may be diffused into silicon if that is used for the substrate 82. Here the substrate 82 is of a suitable material within which the major operational elements are constructed, and it is transparent to the light wavelengths which the interference filter 10 will ultimately be used with.

FIG. 4*b* is a side view of the interference filter 10 after a mask 86 has been applied on top of the substrate 82 and after further diffusion has occurred. The mask 86 consists of a predetermined grating pattern of open regions 86*a* and closed regions 86*b*. The closed regions 86*b* have blocked the portions of the working region 84 below them, and prevents them from being exposed to further diffusion. The open regions 86*a* here have permitted access and further diffusion into the portions of the working region 84 which they left unblocked, thus creating alternating doped layers 88 having different refractive indexes. The mask 86 may then, optionally, be removed and the interference filter 10 here is complete and ready for use.

More complex embodiments of the interference filter 10 can be constructed by using additional and different masks, and other materials or concentrations for doping, deposition, etc. In a straightforward extension of the approaches described above, considerably more than just two layers can be created and more sophisticated and powerful interference filters 10 can be produced.

The present inventor' co pending U.S. patent application for "OPTICAL GRATING FABRICATION, serial number pending, filed on Sep. 14, 2001, hereby incorporated by reference in its entirety, discusses some materials also suitable for this invention. However, materials which will be suitable for use in this invention will generally be apparent to those skilled in the art, particularly in view of this disclosure. Accordingly limitation should not be inferred in the choices or the natures of the materials which may be used.

Figure 5:
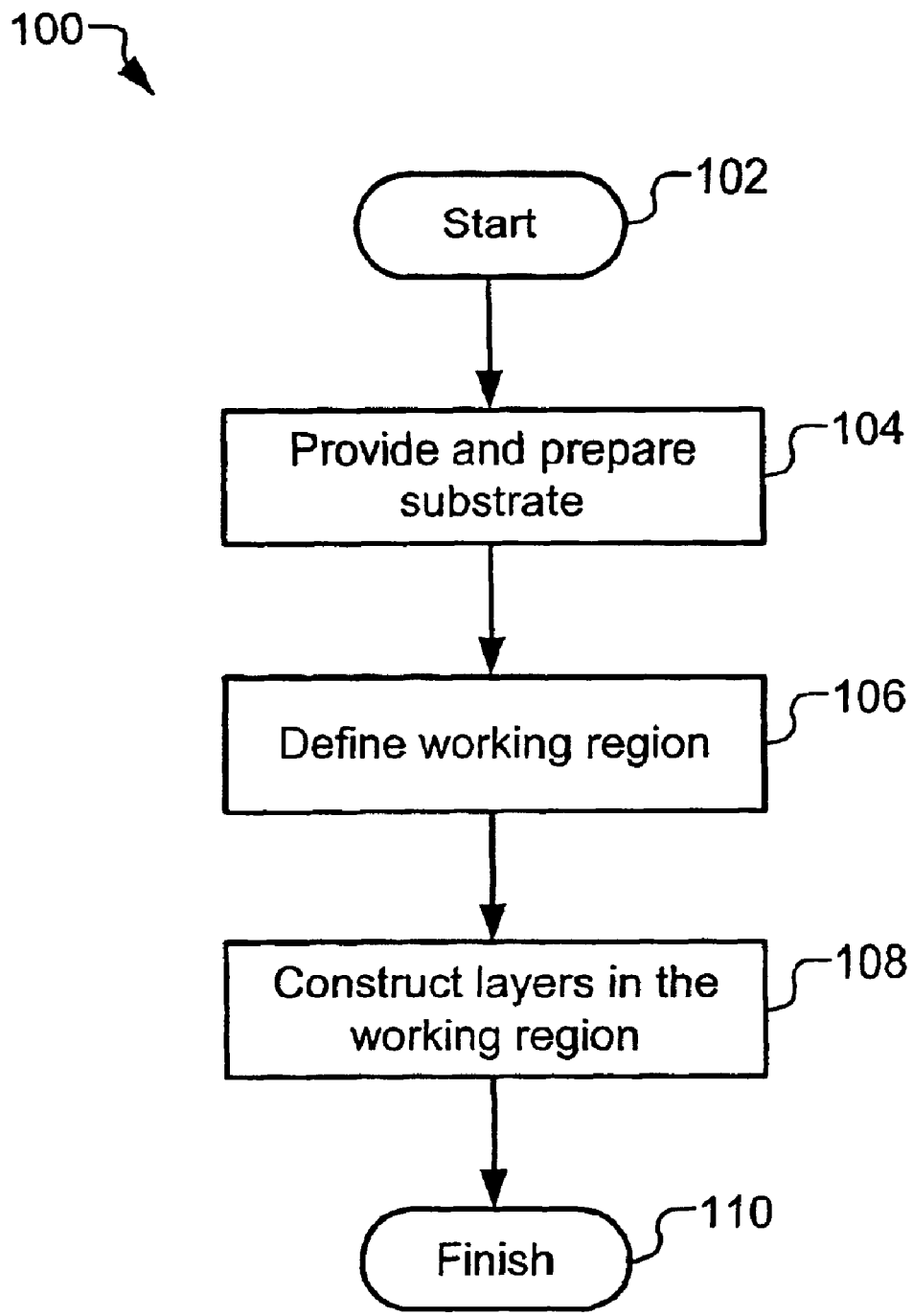
FIG. 5 is a flow chart summarizing a process for creating the inventive interference filter.

FIG. 5 is a flow chart summarizing a process 100 for creating the inventive interference filter 10. The process 100 starts in a step 102, where basic and conventional set-up operations can be performed, as needed and as desired.

In a step 104 a substrate is provided and prepared. This serves as the basis of a workpiece for the rest of the process 100 and for construction of operational parts of the interference filter 10.

In a step 106 a working region is constructed in or on the substrate.

In a step 108 layers are constructed in the working region.

Finally, in a step 110 the process 100 ends. This is where basic and conventional wrap up operations can be performed, as needed and as desired. The process 100, which indeed has been described here very generally, is now finished.

Figure 6:
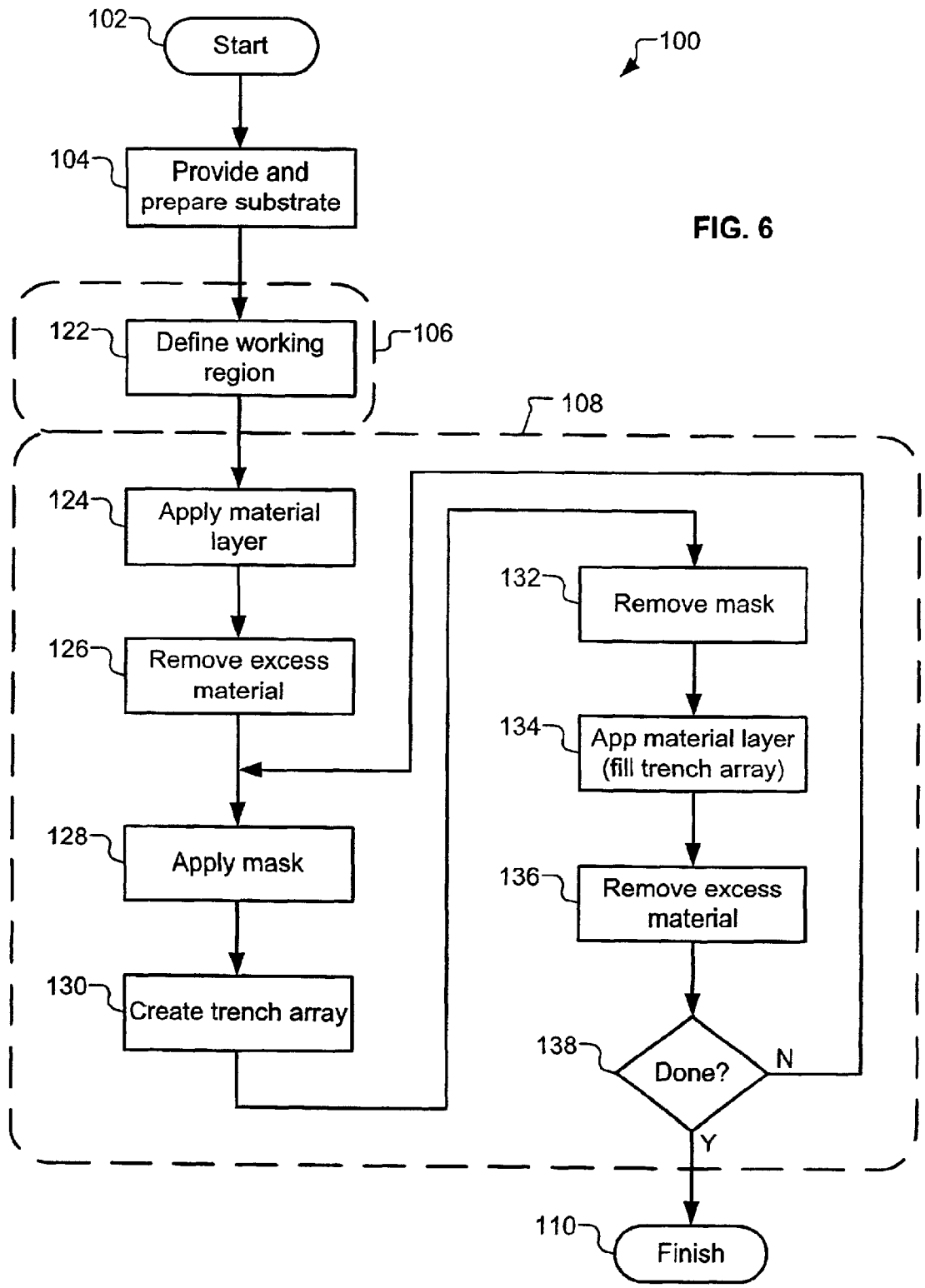
FIG. 6 is a flow chart showing detailed application of the process of FIG. 5 to create the interference filter of FIGS. 3*a–j*.

FIG. 6 is a flow chart showing application of the process 100 to create the interference filter 10 of FIGS. 3*a–j*. This begins with step 102 (start) and step 104 (substrate preparation) again occurring.

The step 106 (constructing the working region) here includes a single sub-step 122 for preparing the working region 56 in the substrate 52, and thus concurrently defining the backing region 60.

The step 108 (constructing layers in the working region) here includes a number of sub-steps. The first of these is a sub-step 124 for applying the first material layer 62, and filling in the entire working region 56. In a sub-step 126 excess material is then removed.

In a sub-step 128 a mask layer then is applied, e.g., the photoresist layer 64 is applied and the predefined pattern of the exposed regions 64*a* and the unexposed regions 64*b* are created in it. In a sub-step 130 the trench array 66 is created by removing parts of the first material layer 62 under the predefined pattern. In a sub-step 132 the remainder of the mask layer is removed.

In a sub-step 134 another material layer is applied, filling in the trench array 66, and in a sub-step 136 excess material is removed.

At this point the interference filter 10 is nominally complete and usable. If it is desired to use more than two sets of layers of materials, a sub-step 138 can be provided to determine if the total number of layers has been reached, and to direct the process 100 through further iterations of sub-steps 128–138 until such is the case. Different predefined patterns will typically be used for such other iterations.

Once all of the layers have been constructed in the working region 56 and, if desired, once any excess material has been removed, in the final step 110 the process 100 wraps up and is finished.

Figure 7:
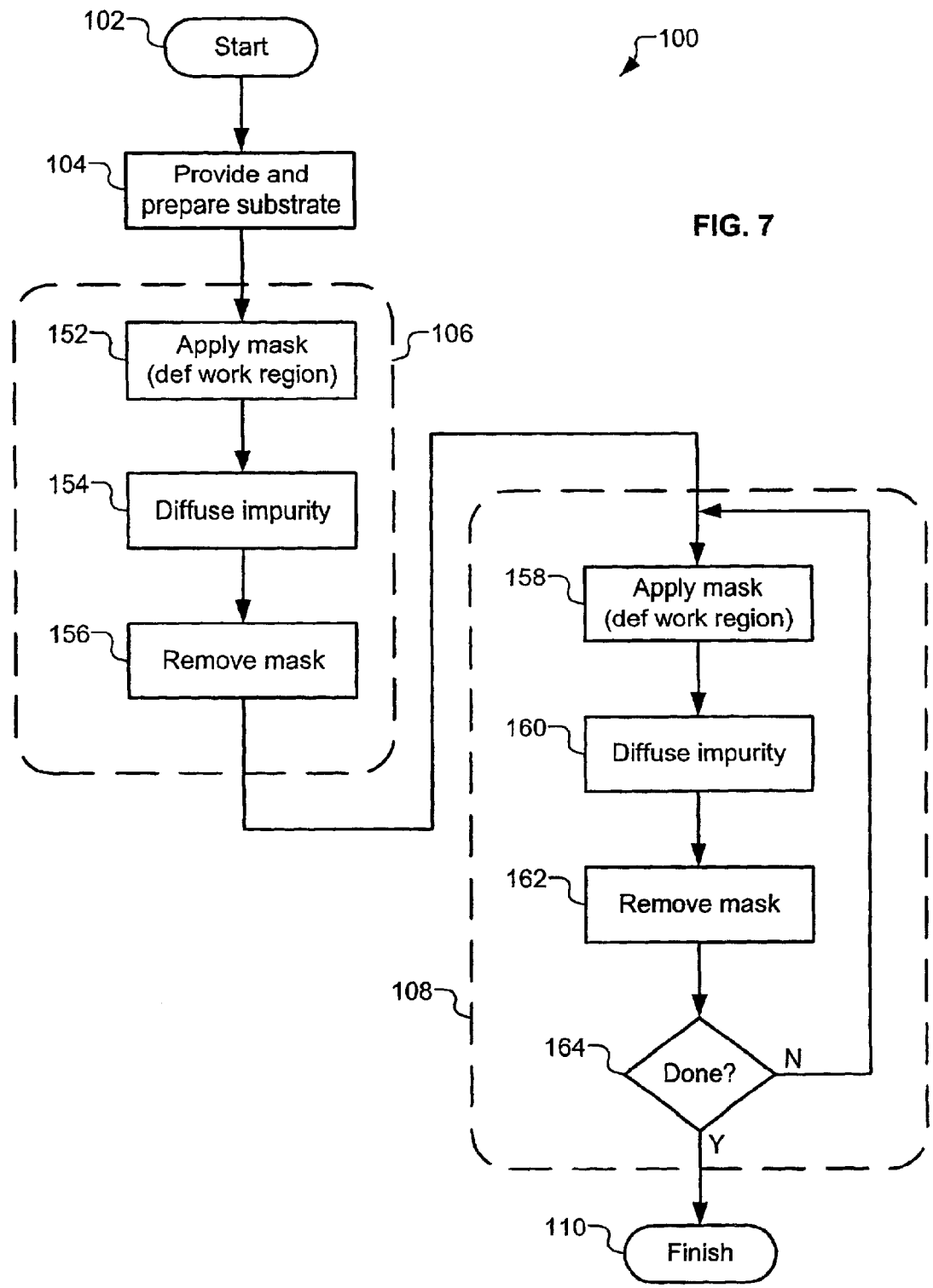
FIG. 7 is a flow chart showing detailed application of the process of FIG. 5 to create the interference filter of FIGS. 4*a–b*.

FIG. 7 is a flow chart showing application of the process 100 to create the interference filter 10 of FIGS. 4*a–b*. This also begins with initial step 102, followed by step 104 (substrate preparation).

The step 106 (constructing the working region) here includes a series of sub-steps for preparing the working region 84 in the substrate 82. In a sub-step 152 a mask is provided to define the working region 84. Photo-etching or other techniques may be used for this. In a sub-step 154 an impurity is then diffused into the working region 84. In a sub-step 156 the mask is then typically removed, since it might constitute a source of contamination or otherwise interfere in later operations.

The step 108 (constructing layers in the working region) here also includes a number of sub-steps. The first of these is a sub-step 158 for providing the mask 86. In a substep 160 an impurity is diffused into the working region 84 below the open regions 86*a* of the mask 86. This may be additional of the impurity used in sub-step 154 or it may be a different impurity.

In a sub-step 162 the mask used here is also removed. This is also optional, but it is usually desirable to prevent interference in later operations, if any, or simply to improve product finish and appearance.

At this point the interference filter 10 is nominally complete and usable. If it is desired to use more than two sets of layers of doping, a sub-step 164 can be provided to determine if the total number of layers has been reached, and to direct the process 100 through further iterations of step 108 (sub-steps 158–164) until that is the case.

Once all of the doped layers 88 have been constructed in the working region 84 and, if desired, once any excess material has been removed, in the final step 110 this variation of the process 100 wraps up and is finished.

Summarizing, the process 100 for the inventive interference filter 10 starts with a substrate. A working region is then defined on or in the substrate. If the working region is "on" the substrate, it is open and coating materials must then be applied to fill it. If the working region is "in" the substrate, it is closed and the substrate is itself of one suitable dielectric or coating material. Two methods have been described for constructing such layers: material application and material alteration for constructing the characteristic feature of an interference filter, a plurality of alternating layers of coating materials.

FIGS. 3a–j and FIG. 6 are an example of material application using two coating materials in addition to the substrate. It should also be noted that there is a two-materials degenerate case including the substrate. Rather than define the working region as the large open working region 56 of FIG. 3b, a trench array can be formed directly in the substrate and this can be filled in with a single other coating material, to form alternating layers of just two different refractive indexes.

FIGS. 4a–b and FIG. 7 are an example of material alteration using two coating materials in addition to the substrate. It should be noted here as well that there is a possible two-materials degenerate case that includes the substrate. Rather than define the working region by doping all of it, as is the case for the working region 84 of FIG. 4a, doped layers can be formed directly in the substrate, alternating with the material of the substrate itself and thus providing layers of just two different refractive indexes.

It should further be appreciated that material application and alteration techniques may be combined. For instance, the working region might be doped, then a trench array formed, and then that filled with a coating material having different refractive index. Alternately, a trench array of wide trenches could be formed, filled with one material, and then a mask and pattern used to dope part of the material in the wide trenches to form it into two or more sets of layers, in addition to sets of layers the material not in the trench. Of course, multiple iterations of these variations are also possible, all while maintaining very high accuracy in dimensions and consistent high yield.

It should now also be noted that the examples in the figures herein have shown a single filter and no external components. There will, of course, be conventional external components such as a laser light source, and typically much more. Furthermore, however, in suitable applications considerable benefit can be obtained by using filters or even multiple filters and other components together. One of the particular strengths of micro fabrication type processes, as used by the present invention, is that they can be used to construct large numbers and varieties of components concurrently. Such products can then be used either in operational combination or separately. Thus, for example, multiple interference filters 10 can be constructed together, having the same characteristics or different ones to work with different light wavelengths. If desired, other electrical and micro-mechanical components can also be constructed in the same substrate or in the same layer materials, e.g., one or more electro-optical sensors or micro mirrors. The present invention is thus very highly integrateable with IC and MEMS technology.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present inventive process 100 is well suited for application in the production of optical filters, particularly including interference filters 10. The inventive process uses micro fabrication process such as photolithography, etching, thin film deposition, doping, stripping, thermal annealing, chemical mechanical polishing (CMP), planarization, etc., which are common in the production of electronic integrated circuits and micro electro-mechanical systems, to now also produce optical filters in or atop substrate materials.

As such, the invention may provide the many benefits of such generally accepted technology in a field where such are highly desired. Such benefits include, without limitation, high production yield and the ability to closely monitor and improve the manufacturing processes used. As described elsewhere herein, a major failing of the prior art has been low manufacturing yield, partly due to the processes being used imposing severe limitations on the ability to determine and correct the causes of problems in those processes. In contrast, the present invention employs mature and more easily worked with processes, such as those used in semiconductor microfabrication.

The invention also opens up some potentially very useful applications to the use of interference filters. Conventional interference filters have tended to be large and discrete devices, largely due to the fabrication process used to make them. However, as in many arts today, it is increasingly desirable to miniaturize and to integrate interference filters into larger assemblies. The present process 100 is particularly able to provide the inventive interference filters 10 for these needs.

Prior art interference filters have largely been an all-of-the-wafer project, requiring that a full wafer-sized filter be fabricated and that smaller filters be cut from this, or that special handling be attempted of smaller workpieces. In many applications this introduces additional opportunity for damage and lowered yield. It also frequently imposes packaging and handling constraints when the filter is incorporated in to a larger product. These limitations all contribute to increased production costs. In contrast, quite small instances of the interference filters 10 can be directly fabricated and many of the problems of the prior art thus avoided.

The prior art processes used to make conventional interference filters also do not integrate with other manufacturing processes well, and thus it is difficult or even impossible to construct highly integrated products using such conventional interference filters. Today we see a rapidly increasing desire to integrate electrical, mechanical, and optical systems, as well as to miniaturize them. The inventive interference filters 10 as products by the process 100 here are particularly able to fill this need. They are inherently integrateable, for example, with IC and MEMS technology.

For the above, and other reasons, it is expected that the process and products of the present invention will have widespread industrial applicability. Therefore, it is expected that the commercial utility of the present invention will be extensive and long lasting.

What is claimed is:

1. A method for fabricating an interference filter, the method comprising the steps of:

(a) providing a substrate, wherein said substrate is defined to be horizontal;

(b) defining a working region with respect to said substrate; and (c) constructing a plurality of layers of coating materials in said working region, wherein said plurality of layers are constructed vertically relative to said substrate and are disposed to receive incident light horizontally, thereby fabricating an interference filter wherein said incident light travels substantially in the plane of the interference filter.

2. The method of claim 1, wherein said plurality of layers are constructed having a thickness which is a function of $m*\lambda/4$, where m is an odd integer number and $\lambda$ is the wavelength of light which the interference filter characteristically filters.

3. The method of claim 1, wherein said plurality of layers are constructed by at least one method in the set consisting of applying and altering a said coating material.

4. The method of claim 1, wherein said step (c) includes:

(d) defining a first said coating material in said working region;

(e) removing portions of said first said coating material to form a trench array; and (f) filling said trench array with a second said coating material, wherein said first said coating material and said second said coating material have different refractive indexes.

5. The method of claim 4, further comprising:

(g) applying said first said coating material into said working region.

6. The method of claim 5, wherein said step (g) includes depositing said first said coating material into said working region.

7. The method of claim 4, wherein said step (e) includes photoetching said first said coating material.

8. The method of claim 4, wherein said step (f) includes depositing said second said coating material into said trench array.

9. The method of claim 1, wherein said step (c) includes:

(d) defining a first said coating material in said working region; and (e) altering portions of said first said coating material into a second said coating material, wherein said first said coating material and said second said coating material have different refractive indexes.

10. The method of claim 9, further comprising:

(g) altering a preexisting material in said working region into said first said coating material.

11. The method of claim 10, wherein said step (g) includes diffusing an impurity into said preexisting material in said working region.

12. The method of claim 9, wherein said step (e) includes:

photomasking said first said coating material; and diffusing an impurity into said first said coating material to convert it into said second said coating material.

13. An interference filter manufactured according to the method of claim 1.

14. An interference filter manufactured according to the method of claim 2.

15. An interference filter manufactured according to the method of claim 3.

16. A interference filter manufactured according to the method of claim 4.

17. A interference filter manufactured according to the method of claim 9.

18. A interference filter manufactured according to the method of claim 8.

19. A interference filter manufactured according to the method of claim 12.

* * * * *